United States Patent
Lin et al.

(10) Patent No.: US 8,475,892 B2
(45) Date of Patent: Jul. 2, 2013

(54) TRANSFER FILM AND METHOD OF MANUFACTURING SAME

(75) Inventors: Wei-Yu Lin, Taipei Hsien (TW); Pai-Sheng Wei, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 12/840,221

(22) Filed: Jul. 20, 2010

(65) Prior Publication Data

US 2011/0159255 A1  Jun. 30, 2011

(30) Foreign Application Priority Data

Dec. 31, 2009  (CN) .......................... 2009 1 0312999

(51) Int. Cl.
*B41M 5/40* (2006.01)
*B41M 5/395* (2006.01)
*B41M 5/44* (2006.01)
*B41M 5/392* (2006.01)
*B41M 3/12* (2006.01)
*C09D 11/10* (2006.01)
*C09D 11/00* (2006.01)
*H01J 29/43* (2006.01)

(52) U.S. Cl.
CPC ................ *B41M 5/395* (2013.01); *B41M 5/44* (2013.01); *B41M 5/392* (2013.01); *B41M 3/12* (2013.01); *C09D 11/101* (2013.01); *C09D 11/40* (2013.01); *Y02E 10/50* (2013.01); *H01J 29/43* (2013.01)

USPC .................... 428/32.6; 428/32.77; 428/32.78; 428/32.79; 428/32.87; 106/31.13; 106/31.6; 427/74; 427/75

(58) Field of Classification Search
CPC .......... B41M 5/395; B41M 5/44; B41M 5/392; B41M 3/12; C09D 11/101; C09D 11/40; Y02E 10/50; H01J 29/43
USPC ............ 428/32.6, 32.77, 32.78, 32.79, 32.87; 106/31.13, 31.6; 427/74, 75
See application file for complete search history.

(56) References Cited

U.S. PATENT DOCUMENTS

| | | | | |
|---|---|---|---|---|
| 4,875,961 | A * | 10/1989 | Oike et al. ..................... | 156/234 |
| 6,040,040 | A * | 3/2000 | Rainbow ...................... | 428/32.6 |
| 6,228,486 | B1 * | 5/2001 | Kittel et al. .................. | 428/354 |
| 6,461,722 | B1 * | 10/2002 | Kittel et al. ................. | 428/32.51 |
| 2005/0153113 | A1 * | 7/2005 | Hseih et al. ................... | 428/201 |
| 2006/0111503 | A1 * | 5/2006 | Killilea et al. ................ | 524/501 |
| 2007/0009732 | A1 * | 1/2007 | Tsai et al. ..................... | 428/349 |
| 2007/0017415 | A1 * | 1/2007 | Oyanagi et al. ............. | 106/31.65 |
| 2009/0118388 | A1 * | 5/2009 | Naruse et al. .................. | 522/39 |

FOREIGN PATENT DOCUMENTS

CN    1986211    6/2007

* cited by examiner

*Primary Examiner* — Betelhem Shewareged
(74) *Attorney, Agent, or Firm* — Altis Law Group, Inc.

(57) ABSTRACT

A transfer film includes a substrate, a decorative layer, and an adhering layer. The decorative layer is positioned by solidifying ultraviolet curing ink on the substrate. The adhering layer is positioned on the decorative layer.

16 Claims, 2 Drawing Sheets

TRANSFER FILM AND METHOD OF MANUFACTURING SAME

BACKGROUND

1. Technical Field

The present disclosure relates to a transfer film and a method of manufacturing the transfer film.

2. Description of Related Art

Transfer films have been used for many years. An image is printed on a transfer film and then transferred onto a portion of material such as textile or leather by pressure or heating. Typically, the image is printed on the transfer film by intaglio printmaking or screen printing. A typical printing process includes color separation, engraving plates, printing film for checking plates, bringing into register, and so on. However, the process is long and complex. Furthermore, solvent-based ink is used for the printmaking. The ink is dried by evaporating the volatile organic solvent. But, the volatile organic solvent is not environmentally friendly.

What is needed, therefore, is a new transfer film and a new method of manufacturing the transfer film to overcome the above-described problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
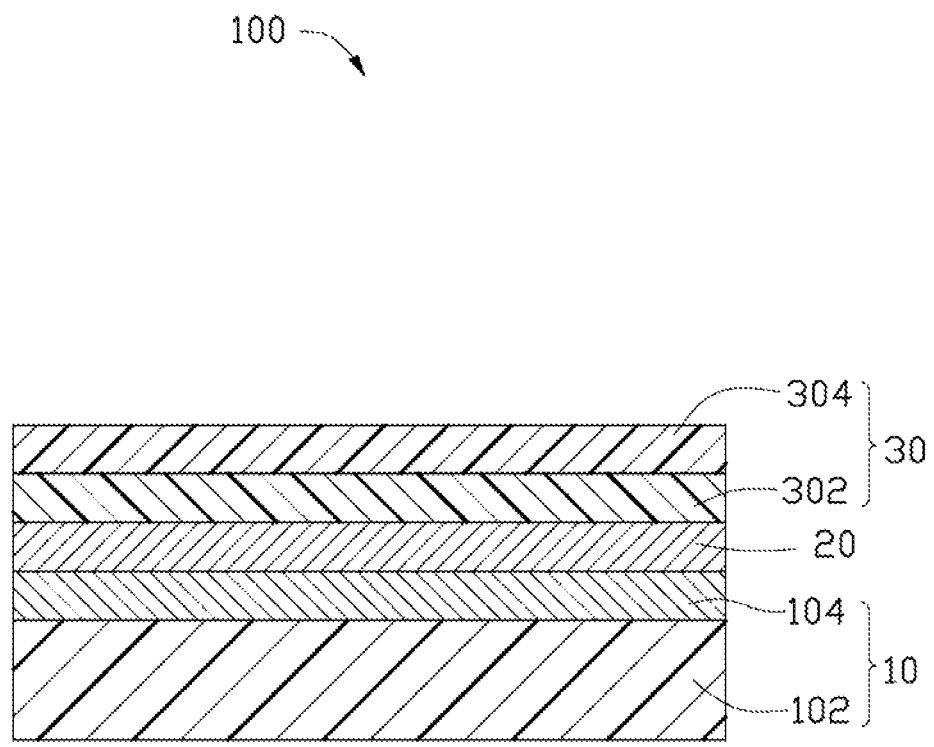
FIG. 1 is a cross-sectional view of a transfer film according to an exemplary embodiment.

Referring to FIG. 1, a transfer film 100 according to an exemplary embodiment, is shown. The transfer film 100 includes a substrate 10, a decorative layer 20 positioned on the substrate 10, and an adhering layer 30 positioned on the decorative layer 20.

The substrate 10 includes a carrier layer 102 and a release layer 104. The carrier layer 104 is a film having high tensile strength. The carrier layer 102 may be a polyethylene terephthalate film or a polyethylene film. The release layer 104 is formed between the carrier layer 102 and the decorative layer 20. The release layer 104 is used for easing the peeling of the carrier layer 102 from the decorative layer 20. The carrier layer 102 can be partially or wholly covered by the release layer 104. The main ingredient of the release layer 104 is organic solvent-based silicone, mineral wax, synthetic wax, or a mixture of the mineral wax and the synthetic wax. In an alternative embodiment, the carrier layer 102 is made of anti-sticking material, and the release layer 104 is omitted.

The decorative layer 20 is formed by solidifying ultraviolet curing ink on the substrate 10 in a desired pattern. In the present embodiment, the decorative layer 20 is printed by digital printing. The ultraviolet curing ink is composed of pigments, photoinitiators, fluid oligomers, and monomers. When the ultraviolet curing ink is exposed to ultraviolet radiation, the photoinitiators release free radicals that cause the polymerization of the fluid oligomers and the monomers, thereby forming a hard and dry ink film containing the pigments. The pigments can be calcium carbonate. The photoinitiators can be 2,4,6-trimethyl phenyl-phosphine. The fluid oligomers can be polyurethane acrylate oligomer. The monomers can be acrylic monomer. The ultraviolet curing ink is environmentally friendly because no solvent needs to be evaporated from the ink.

The adhering layer 30 includes an accessorial adhesive sublayer 304 and an accessorial sublayer 302 formed between the accessorial adhesive sublayer 304 and the decorative layer 20. The accessorial adhesive sublayer 304 is used for adhering the transfer film 100 to an object. The accessorial adhesive sublayer 304 can be heat melt adhesive. In the present embodiment, the accessorial sublayer 302 is used for increasing the adhesive bond strength between the decorative layer 20 and the accessorial adhesive sublayer 304. The accessorial sublayer 302 is made of materials that will stick well to the decorative layer 20 and the accessorial adhesive sublayer 304. The accessorial sublayer 302 can be acrylic resin. The accessorial adhesive sublayer 304 can be polyethylene or vinyl acetate. In an alternative embodiment, the decorative layer 20 and the accessorial adhesive sublayer 304 are made of materials that stick well to each other, and the accessorial sublayer 302 is omitted. In a yet alternative embodiment, the accessorial sublayer 302 can contain pigments to provide background color for the decorative layer 20.

Figure 2:
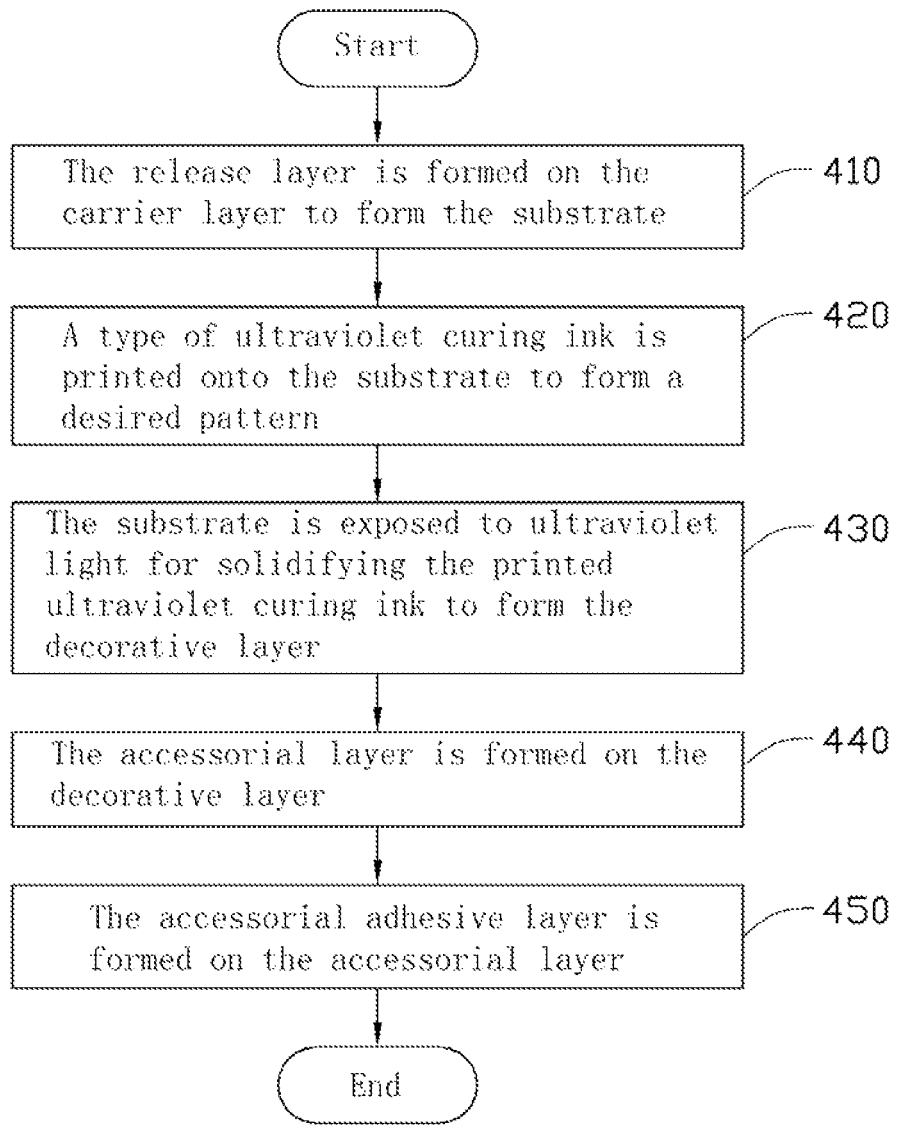
FIG. 2 is a flowchart of one embodiment of a method of manufacturing the transfer film of FIG. 1.

Referring to FIG. 2, one embodiment of a method of manufacturing the transfer film 100 of FIG. 1 is provided. The method includes the following steps.

Step 410, the release layer 104 is formed on the carrier layer 102 to form the substrate 10. The carrier layer 102 can be partially or wholly covered by the release layer 104. The main ingredient of the release layer 104 is organic solvent-based silicone, mineral wax, synthetic wax, or a mixture of the mineral wax and the synthetic wax.

Step 420, a type of ultraviolet curing ink is printed onto the substrate 10 to form a desired pattern. In the present embodiment, the ultraviolet curing ink is composed of pigments, photoinitiators, fluid oligomers, and monomers. When the ultraviolet curing ink is exposed to ultraviolet radiation, and the photoinitiators release free radicals that cause the polymerization of the fluid oligomers and the monomers, thereby forming a hard and dry ink film containing the pigments. The pigments can be calcium carbonate. The photoinitiators can be 2,4,6-trimethyl phenyl-phosphine. The fluid oligomers can be polyurethane acrylate oligomer. The monomers can be acrylic monomer. This process is quicker and easier than the conventional printing process.

Step 430, the substrate 10 is exposed to ultraviolet light for solidifying the printed ultraviolet curing ink to form the decorative layer 20. This step and step 420 can be carried out simultaneously.

Step 440, the accessorial sublayer 302 is formed on the decorative layer 20. The accessorial sublayer 302 can be acrylic resin.

Step 450, the accessorial adhesive sublayer 304 is formed on the accessorial sublayer 302. The accessorial adhesive sublayer 304 can be heat melt adhesive. The accessorial adhesive sublayer 304 can be polyethylene or vinyl acetate.

The carrier layer 102 and the decorative layer 20 can be made of materials that will not stick to each other, and step 410 can then be omitted. Alternatively, if the decorative layer 20 and the accessorial adhesive sublayer 304 are made of the materials that will stick to each other, then step 440 can be omitted.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A transfer film, comprising:
a substrate;
a decorative layer formed by solidifying ultraviolet curing ink on the substrate;
an adhering layer positioned on the decorative layer, the adhering layer comprising an accessorial adhesive sublayer and an accessorial sublayer positioned between the accessorial adhesive sublayer and the decorative layer, and the accessorial sublayer comprising pigments.

2. The transfer film as claimed in claim 1, wherein the decorative layer is printed by digital printing.

3. The transfer film as claimed in claim 1, wherein the ultraviolet curing ink is composed of pigments, photoinitiators, fluid oligomers, and monomers, if the ultraviolet curing ink is exposed to ultraviolet radiation, the photoinitiators release free radicals that cause the polymerization of the fluid oligomers and the monomers, thereby forming the decorative layer containing the pigments.

4. The transfer film as claimed in claim 3, wherein the pigments are calcium carbonates, the photoinitiators are 2,4,6-trimethyl phenyl-phosphines, the fluid oligomers are polyurethane acrylate oligomers, and the monomers are acrylic monomers.

5. The transfer film as claimed in claim 1, wherein the substrate comprises a carrier layer and a release layer positioned between the carrier layer and the decorative layer, and the release layer is configured for easing the peeling of the carrier layer from the decorative layer.

6. The transfer film as claimed in claim 5, wherein the carrier layer is selected from the group consisting of a polyethylene terephthalate film and a polyethylene film.

7. The transfer film as claimed in claim 5, wherein the release layer is comprised of a material selected from the group consisting of an organic solvent-based silicone, a mineral wax, a synthetic wax, and a mixture of the mineral wax and the synthetic wax.

8. A method of manufacturing a transfer film, comprising:
providing a substrate;
printing an ultraviolet curing ink onto the substrate to form a desired pattern;
exposing the substrate to ultraviolet light for solidifying the ultraviolet curing ink to form a decorative layer;
forming an accessorial sublayer on the decorative layer; and
forming an accessorial adhesive sublayer on the accessorial sublayer;
wherein the accessorial sublayer comprising pigments.

9. The method as claimed in claim 8, wherein the ultraviolet curing ink is composed of pigments, photoinitiators, fluid oligomers, and monomers, and exposing the substrate to ultraviolet light for solidifying the ultraviolet curing ink to form a decorative layer comprises exposing the ultraviolet curing ink to the ultraviolet radiation, which makes the photoinitiators release free radicals to cause the polymerization of the fluid oligomers and the monomers, thereby forming the decorative layer containing the pigments.

10. The method as claimed in claim 8, wherein the pigments are calcium carbonates, the photoinitiators are 2,4,6-trimethyl phenyl-phosphines, the fluid oligomers are polyurethane acrylate oligomers, and the monomers are acrylic monomers.

11. The method as claimed in claim 1, wherein the accessorial sublayer is acrylic resin, and the accessorial adhesive sublayer is selected from the group consisting of polyethylene and vinyl acetate.

12. The method as claimed in claim 8, wherein providing a substrate comprises positioning a release layer on a carrier layer to form the substrate.

13. The method as claimed in claim 12, wherein the release layer is comprised of a material selected from the group consisting of organic solvent-based silicone, mineral wax, synthetic wax, and a mixture of the mineral wax and the synthetic wax.

14. The method as claimed in claim 12, wherein the carrier layer is selected from the group consisting of a polyethylene terephthalate film and a polyethylene film.

15. The transfer film as claimed in claim 1, wherein the accessorial sublayer consists of acrylic resin, and the accessorial adhesive sublayer consists of polyethylene or vinyl acetate.

16. The method as claimed in claim 8, wherein the accessorial sublayer consists of acrylic resin, and the accessorial adhesive sublayer consists of polyethylene or vinyl acetate.

* * * * *